United States Patent
Meisen et al.

(10) Patent No.: US 7,387,671 B2
(45) Date of Patent: *Jun. 17, 2008

(54) IRON OXIDE PIGMENTS

(75) Inventors: Ulrich Meisen, Kall (DE); Leslaw Mleczko, Dormagen (DE)

(73) Assignee: LANXESS Deutschland GmbH, Leverkusen (DE)

(*) Notice: Subject to any disclaimer, the term of this patent is extended or adjusted under 35 U.S.C. 154(b) by 16 days.

This patent is subject to a terminal disclaimer.

(21) Appl. No.: 10/547,598

(22) PCT Filed: Mar. 4, 2004

(86) PCT No.: PCT/EP2004/002178

§ 371 (c)(1),
(2), (4) Date: Feb. 16, 2006

(87) PCT Pub. No.: WO2004/083318

PCT Pub. Date: Sep. 30, 2004

(65) Prior Publication Data

US 2006/0196392 A1    Sep. 7, 2006

(30) Foreign Application Priority Data

Mar. 17, 2003    (DE)    ................ 103 11 550

(51) Int. Cl.
*C09C 1/24*    (2006.01)
*C09C 3/00*    (2006.01)

(52) U.S. Cl. .............. 106/456; 106/460; 106/712; 162/162; 423/632; 423/633; 424/63; 424/401; 426/540

(58) Field of Classification Search ............ 106/456, 106/460, 712; 162/162; 423/632, 633; 424/63, 424/401; 426/540
See application file for complete search history.

(56) References Cited

U.S. PATENT DOCUMENTS

| | | | |
|---|---|---|---|
| 5,421,878 A | 6/1995 | Lerch et al. | 106/456 |
| 5,911,967 A | 6/1999 | Ruthner | 423/632 |
| 6,179,908 B1 * | 1/2001 | Braun et al. | 106/456 |
| 6,503,315 B1 | 1/2003 | Etzenbach et al. | 106/456 |

* cited by examiner

Primary Examiner—Anthony J. Green
(74) Attorney, Agent, or Firm—Nicanor A. Kohncke; Norman Thot

(57) ABSTRACT

Iron Oxide pigment containing greater than 99% iron oxide, having a chloride content of less than 0.1% and a mean solid diameter of 10 to 500 μm and methods of making the same are disclosed.

26 Claims, 1 Drawing Sheet

IRON OXIDE PIGMENTS

The invention relates to red iron oxide pigments having a mean solids diameter of 10 to 500 μm and to their preparation and their use.

There are various processes for the preparation of red iron oxide pigments:

a) Laux Process

The Laux process starts from nitrobenzene and Fe metal and leads initially to iron oxide black or iron oxide yellow and aniline. In order to prepare iron oxide red by this process, the iron oxide black obtained is calcined. The process is very complicated and is not easy to master since variable proportions of control chemicals have to be used in order to establish the desired particle size. Moreover, the required apparatus technology is demanding and correspondingly expensive. Furthermore, aniline forms as a second product under reaction and, owing to its properties, necessitates particular occupational hygiene measures.

A disadvantage of the iron oxide red prepared by the Laux process is that the iron oxide red has a tendency to flocculate in the finish and to agglomerate. Furthermore, the iron oxide red prepared by the Laux process produces dust and have a high DIN pH value (6).

b) Precipitation Process

The preparation of iron oxide red by a direct precipitation process is described in U.S. Pat. No. 5,421,878. The direct precipitation process is difficult in terms of process engineering since $\alpha$-$Fe_2O_3$ is obtainable only in a narrow range and the reaction is not easy to master. The iron oxide red prepared by the precipitation process has the disadvantage of high salt loads which pollute the wastewater and are therefore ecologically unsafe.

Apart from high production costs, the iron oxide reds prepared by the precipitation process furthermore have the disadvantage that they produce dust and have a high DIN pH value (4.5 to 6).

c) Hydrothermal Process

The hydrothermal process is described in DE-A-19917786. Iron oxide red pigments for high-quality applications, in particular for paints and finishes, can be prepared by the hydrothermal process. However, the high process costs due to the pressure technique have a disadvantageous effect here. This process is therefore not suitable for simple applications in which economical products are required.

Apart from high production costs, the iron oxide red pigments prepared by the hydrothermal process furthermore have the disadvantage that they produce dust.

d) Penniman-Zoph Process

The hydrothermal process is described in DE-A-19958168. According to the Penniman-Zoph process, iron oxide red pigments are prepared by dissolving iron metal with addition of an iron oxide red nucleus and oxidizing it. Here, as a rule nitric acid is used for producing the nucleus, so that nitrate or ammonia is present in the wastewater and has to be removed by means of complicated process engineering. As in the hydrothermal process and in the precipitation process, this leads to high production costs which limit the application of such pigments to a few fields.

Apart from an expensive and environmentally polluting preparation process, the iron oxide reds prepared by the hydrothermal process furthermore have the disadvantage that they produce dust and have a high DIN pH (4.5 to 6).

e) Calcination of Iron-containing Materials

The calcination of iron-containing materials is described in EP-A-0 911 369. Iron oxide red can be prepared by calcining iron oxide yellow, iron oxide black or other iron-containing oxidic or metallic solids. Owing to the high temperatures required, the quality of the iron oxide red pigments prepared therefrom suffers. In order to prepare high-quality iron oxide red pigments, high-quality precursor compounds are therefore required and make the process more expensive.

The iron oxide red pigments prepared by calcining iron-containing materials furthermore have the disadvantage that they are relatively hard and have to be milled by a complicated procedure. Furthermore, the iron oxide reds prepared by calcining iron-containing materials produce dust.

f) Decomposition of $FeSO_4$

The decomposition of iron(II) sulfate at high temperatures leads to iron oxide red and $SO_2$, which can be reacted to give sulfuric acid. Owing to the high temperatures required and the corrosiveness of the gases formed, this process requires high expenditures on apparatus technology.

Apart from the disadvantages of the preparation process which are described above, the iron oxide reds prepared by decomposing $FeSO_4$ furthermore have the disadvantage that they produce dust.

For many applications in the area of the coloring of concrete parts, emulsion paints and paper coloring, granules are now used since they produce little dust, and are flowable and readily dispersible. In the customary granulation processes, powders are used as starting materials and are mixed with a binder and then granulated. Customary granulation processes are spray granulation, press granulation and pan granulation.

g) Pyrohydrolysis of $FeCl_2$ or $Fe(NO_3)_2$

Pyrohydrolysis has been developed to industrial maturity since about 1960 and initially served mainly for recovering HCl from pickling solutions ($FeCl_2$). In the meantime, it has become an important process for obtaining oxide raw materials, in particular iron oxides. Advantages of this process are that it can be operated continuously, uses liquid raw materials, is economical and uses no byproducts and process chemicals and is therefore particularly environmentally friendly.

This process is widely used in the metallurgical industry. The main product here is the recovered hydrochloric acid (in some cases also hydrofluoric acid or nitric acid), which is reused for pickling steel. Iron oxide forms as a byproduct and is initially fed back to the blast furnace. By special purification steps for the pickle ($FeCl_2$ solution), it is possible to prepare pure iron oxides for the ferrite industry. In the case of this application, an exactly defined chemical composition which is as constant as possible and a low degree of impurities are required. Relatively hard-sintered oxides having as low a chloride content as possible are required. The specific surface area (determined according to the BET method) is usually 3-5 $m^2/g$, depending on the reaction temperature of the decomposition. In individual cases, BET surfaces areas of 10 $m^2/g$ can also be achieved. The process is described in detail in articles and patents (Kladnig, W. & Karner, W.; cfi/Ber DKG 67 (1990), 80; EP-A-0850881).

Owing to the low specific surface area of such products, these are not suitable for high-quality pigment applications since they have an undesired blue tinge. Customary commercially available iron oxide red pigments prepared by the pyrohydrolysis process have BET surface areas between 2 and 5.5 $m^2/g$ (company brochure Bailey-PVS Oxides L.L.C.; company brochure Thyssen Krupp Stahl 05/2000 [Thyssen Krupp Steel 05/2000]). Owing to their low specific surface area, these products, too, have a blue tinge and are therefore not suitable for high-quality pigment applications.

It was the object of the invention to prepare a low-dust, free-flowing red iron oxide pigment which has good color properties, i.e. no blue tinge, even without a binder.

Figure 1:
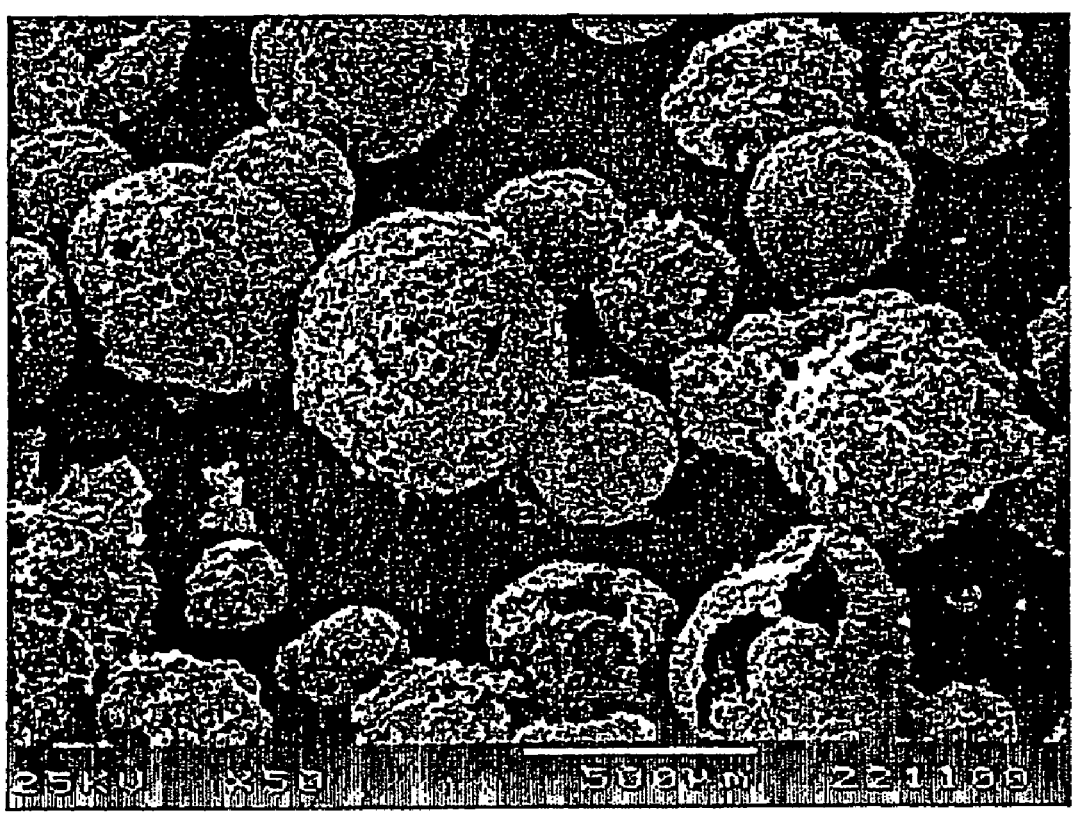
FIG. 1. shows a photograph of the solids according to the invention.

The invention relates to iron oxide pigments having L*, a* and b* values, measured in the lightened tone according to CIELAB units, of
L*=58 to 62, in particular 59 to 60.5,
a*=22 to 27, in particular 23 to 26,
b*=10 to 24, in particular 10 to 15, and having an iron oxide content greater than 99% by weight, based on the pigment, and a mean solids diameter of 10 to 500 µm.

In the context of this Application, "solids" are understood as meaning spheres or hollow spheres, it being possible for the hollow spheres to contain one or more holes. The majority of the solids, i.e. more than 50%, consists of hollow spheres. A photograph of the solids according to the invention is shown in FIG. 1.

The solids of the iron oxide pigments preferably have a BET surface area of 6.0 to 12.0 m²/g.

The solids of the iron oxide pigments consist of primary particles which preferably have a mean size of 0.05 to 0.5, preferably of 0.1 to 0.3, µm. The primary particles are likewise part of the invention.

The iron oxide pigment preferably has a DIN pH of 2.5 to 4.0, preferably of 2.8 to 3.5.

It is also preferable if the chloride content is 0.1% by weight or less, based on the pigment.

The invention furthermore relates to an iron oxide pigment having L*, a* and b* values, measured in the lightened tone according to CIELAB units, of
L*=58 to 62, in particular 59 to 60.5,
a*=22 to 27, in particular 23 to 26,
b*=10 to 24, in particular 10 to 15, and the iron oxide pigment consisting of primary particles which have a mean size of 0.05 to 0.5, in particular 0.1 to 0.3, µm.

The iron oxide pigment preferably has a DIN pH of 2.5 to 4.0, preferably of 2.8 to 3.5.

The abovementioned iron oxide pigment preferably has a chloride content of 0.1% by weight or less, based on the pigment.

The invention furthermore relates to a process for the preparation of the iron oxide pigments according to the invention, characterized in that drops of an aqueous iron chloride solution are dewatered in order to form solids, which are subsequently calcined.

In the context of this Application, "calcination" is understood as meaning the thermal decomposition of the iron chloride solution according to one of the following equation:

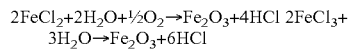

The process according to the invention is preferably carried out in such a way that the iron chloride solution, in which iron chloride of the iron chloride solution is present $FeCl_2$ and/or $FeCl_3$, is sprayed into a reactor through an airless or binary nozzle so that drops having a mean diameter of 50 to 1000 µm form.

The dewatering preferably takes place at a temperature of 300 to 900° C., preferably of 400 to 700° C. The dewatering can be produced, for example, in a reactor by combustion gases, electrical heating, microwave heating or electromagnetic waves. The combustion gases can be fed cocurrently or countercurrently. The gas is preferably separated from the iron oxide pigment inside or outside the reactor and worked up to give hydrochloric acid solution.

The calcination is carried out at temperatures of 200 to 800° C.

The calcination can take place as a result of a thermal treatment, by bringing stream into contact with the solid at temperatures of 200 to 400° C. The thermal treatment can take place in the same or in a separate reactor.

After the calcination, a further thermal treatment at temperatures of 200 to 800° C. can be carried out. In this thermal treatment, the primary particles grow with the result that the tinctorial properties improve. This thermal treatment can take place in the same or in a separate reactor.

The total residence time of the drops/solids at temperatures of more than 300° C. during the dewatering and calcination is preferably between 1 second and 90 minutes, preferably between 5 minutes and 70 minutes.

In addition, after the dewatering, either before or after the calcination, the solids can be cooled and then washed with water.

All preparation steps can be carried out either in the same reactor or in different reactors.

The following reaction parameters are preferably established: Spraying an aqueous $FeCl_2$ solution having a content of 100 to 400 g/l of $FeCl_2$ by means of a binary nozzle into the reactor so that drops having a mean diameter of 50 to 200 µm form. Adjusting the reaction temperature to 300 to 600° C. in the reactor. Subsequent dewatering in the same reactor at temperatures of 600° C. to 800° C. Removal of chloride by passing steam through a bed of the product at 200° to 400° C. Subsequent thermal treatment at temperatures of 600 to 800° C.

The preparation process gives yellow-red iron oxide pigments which are suitable for a broad spectrum of use. These iron oxide pigments can furthermore be prepared in the absence of a binder in the context of the invention. Solids are obtained by the process according to the invention. The majority of the solids are obtained as hollow spheres.

For some applications, particularly in the paint and finish sector, finely milled powders are required. The solids can therefore subsequently be milled after the calcination until a mean size of 0.05 to 0.5, preferably 0.1 to 0.3, µm is reached. The milling apparatus used is preferably a jet mill, a pendulum roller mill or a mechanical classifier mill.

The invention furthermore relates to the use of the iron oxide pigments according to the invention in the construction sector, for paints and finishes, as raw material for the production of hard and soft ferrites, for the production of catalysts, for coloring paper and for use in colored substances in food and/or in the cosmetics sector.

In the context of the present invention, applications in the construction sector are understood as meaning applications in renders, paving stones, mortar mixtures, etc. The iron oxide pigment formed in the reactor can furthermore be filled and used directly after cooling.

The iron oxide pigments according to the invention can be used as solids directly in the construction sector and/or for the production of catalysts.

For some applications, finely milled powders are required. The iron oxide pigments according to the invention can therefore be used as primary particles in the construction sector, for paints and finishes, as raw material for the production of hard and soft ferrites, for the production of catalysts, for coloring paper and for use in colored substances in food and/or in the cosmetics sector.

The invention is to be explained by the following examples:

EXAMPLES

Experimental Arrangement

The measurement of the lightened tone (color strength) of the particles obtained is effected as follows:

The pigment is prepared in a non-drying test binder using a disk pigment dispersing machine (Muller). The test binder (paste) consists of two components.

Component 1

Component 1 is an alkyd resin binder based on linseed oil and phtalic anhydride. It meets the specifications mentioned as requirements of a test binder for pigments in the standards DIN EN ISO 757-24 (October 1995). ISO 787-25:1993 and DIN 55983 (December 1983). The product SACOLYD L 640 is used.

Component 2

Component 2 is a rheolocical additive which is added to the paste to achieve thixotropic behaviour. A powdered, modified, hydrogenated castor oil, LUVOTHIX HT is used at a concentration of 5.0%.

The LUVOTHIX HT is dissolved in the SACOLYD L 640 at 75 to 95° C. The cooled, semi-solid mass is passed once through a three-roll mill and the paste is thus completed.

A disk pigment dispersing machine (Muller) as described in DIN EN ISO 8780-5 (April 1995) is used, namely en ENGELSMANN JEL 25/53 Muller with an effective disk diameter of 24 cm. The speed of the lower disk is approx, 75 $min^{-1}$. By hanging a 2.5 kg weight on the load clamp the force between the disks is adjusted to approx. 0.5 kN.

A commercially available titanium dioxide pigment ®BAYERTITAN R-KB-2 (Bayer AG) is used as the brightening agent. R-KB-2 has a composition corresponding to type R 2 in ISO 591-1977. if another R 2 pigment is used instead of R-KR-2, different CIELAB coordinates may be obtained in the colorimetry.

0.400 g of pigment. 2.000 g of BAYERTITAN R-KB-2 and 3.00 g of paste are dispersed in five steps of 25 rotations each in accordance with the process described in DIN EN ISO 8780-5 (April 1995) section 8.1.

The pigment-paste mixture is then brushed into a paste disk which has a function corresponding to that of the paste disk in DIN 55983 (December 1983). The knife belonging to the paste disk is drawn across the indentation in the disk filled with the pigment-paste mixture such that a smooth surface is formed. The knife is moved in one direction at a rate of appox. 3 to 7 cm/s. The smooth surface is measured within a few minutes.

Colorimeter

A spectrophotometer ("colorimeter") is used with a measuring geometry of d/8 without a gloss trap. This measuring geometry is described in ISO 7724/2-1984 (E) subsection 4.1.1, in DIN 5033, part 7 (July 1983) subsection 3.2.4 and in DIN 53236 (January 1983) subsection 7.1.1.

A DATAFLASH 200 measuring instrument from Datacolor International is used.

The colorimeter is calibrated against a white, ceramic working standard, as described in ISO 7724/2-1984 (E) subsection 8.3. The reflection data of the working standard against an ideal matt white body are stored in the colorimeter so that, after calibration with the white working standard, all colour measurements are related to the ideal matt white body. The black point calibration is carried out with a black hollow body supplied by the colorimeter manufacturer.

Colorimetry

Any gloss trap present is switched off. The temperature of the colorimeter and test specimen is approx. 25° C.+−5° C.

Measuring the Coat of Paint

The coat is placed on the colorimeter in such a way that the measuring aperture covers a middle area of the paint film. The coat must sit close and lie flat. The measuring aperture must be completely covered by the paint film. The measurement then takes place.

Measuring the Paste Disk

Colorimetry takes place immediately after brushing into the paste disk. The filled paste disk is placed on the calorimeter in such a way that the measuring aperture is completely filled in by the indentation in the disk over which paste has been brushed. The disk must sit close and lie flat. The measurement then takes place.

Calculation of the CIE Coordinates

The CIE 1976 (L*, a*, b*) coordinates (abbreviated as CIELAB) of a reflection spectrum are dependent on the constraints selected during measurement and evaluation. The data given for the wavelength range of 400 nm to 700 nm and the interval of 20 nm apply to the DataFlash 2000 colorimeters currently in use.

Only the L*, a* and b* coordinates are given. All other values are redundant. The CIE coordinates L*, a* and b* of 1976 are calculated in accordance with the calculation instructions in ASTM E 308-1985, section 7, from the reflection spectrum measured. The weighting functions of standard illuminant C and of the 2° standard colorimetric observer of 1931 in ASTM E 308-1985, section 7, from the reflection spectrum measured. The weighting functions of standard illuminant C and of the 2° standard colorimetric observer of 1931 ASTM E 308-1985. Table 5.6 are used. The wave length range is between 400 nm and 700 nm. The wavelength interval is 20 nm. No gloss is deducted in the calculation. The L*, a* and b* results are rounded to whole numbers.

The CIE coordinates are named in DIN 5033 Part 3 (July 1992) Coordinates of L*a*b* colour space. In ISO 7724/3-1984 the abbreviation CIELAB colour space is introduced. The coordinates are non-dimensional.

The particle size was determined from transmission electron micrographs (primary particles) or scanning electron micrographs (solids, inter alia as hollow spheres).

The determination of the metallic secondary components was effected by ICP-OES. ICP-OES is a method for determining elements which are present in low concentration in an aqueous sample. It is a spectroscopic method in which the element to be determined is excited and the emitted light of the transition to the ground state, which is characteristic of each element, is measured (OES=optical emission). The excitation is effected by means of a plasma burner (ICP=inductive cuppled plasma). The limit of detection of the method of determination is 5 μg/kg.

The determination of the chloride content was determined argentometrically with potentiometric endpoint determination The limit of detection of the method of determination is 50 mg/kg.

The measurement of the pH of the powder is effected in a suspension in demineralized water according to DIN-EN-ISO 787-9.

Example 1

In a spray roast reactor, an aqueous iron(II) chloride solution having a concentration of 340 g/l of $FeCl_2$ and an HCl content of 10 g/l was sprayed into the reactor at a temperature of 600° C. The throughput was 14 l of solution per hour. The material separated off in the cyclone was recycled to the feed stream. The residence time in the reactor was 10 seconds. Solids formed inter alia in the form of hollow spheres having a mean solids diameter of 80 to 400 μm.

After cooling, the material separated off was washed with water until a chloride content of less than 0.1% by weight was reached.

After the washing, the material was calcined in a laboratory chamber furnace at 800° C. for 60 minutes. The total residence time at temperatures of more than 300° C. was therefore 60 min 10 sec.

The end product had the following properties:
Mean diameter of the solids: 200 μm
Mean diameter of the primary particles: 0.2 μm
L*: 58.4 (lightened tone)
a*: 24.4 (lightened tone)
b*: 13.4 (lightened tone)
Cl content: 0.1% by weight
BET surface area: 6.1 $m^2/g$
DIN pH: 2.9

Example 2

In a spray roast reactor, an aqueous iron(II) chloride solution having a concentration of 340 g/l of $FeCl_2$ and an HCl content of 10 g/l was sprayed into the reactor at a temperature of 560° C. The throughput was 14 l of solution per hour. The material separated off in the cyclone was recycled to the feed stream. The residence time in the reactor was 10 seconds. Solids formed inter alia in the form of hollow spheres having a mean solids diameter of 100 to 500 μm.

After cooling, the material separated off was washed with water until a chloride content of less than 0.1% by weight was reached.

After the washing, the material was calcined in a laboratory chamber furnace at 750° C. for 60 minutes. The cooling rate was 130° C. per minute. The total residence time at temperatures of more than 300° C. was therefore 60 min 10 sec.

The end product had the following properties:
Mean diameter of the solids: 300 μm
Mean diameter of the primary particles: 0.2 μm
L*: 58.9 (lightened tone)
a*: 24.3 (lightened tone)
b*: 13.2 (lightened tone)
Cl content: 0.07% by weight
BET surface area: 9.6 $m^2/g$
DIN pH: 3.4

Example 3

In a spray roast reactor, an aqueous iron(II) chloride solution having a concentration of 340 g/l of $FeCl_2$ and an HCl content of 10 g/l was sprayed into the reactor at a temperature of 560° C. The throughput was 14 l of solution per hour. The material separated off in the cyclone was recycled to the feed stream. The residence time in the reactor was 10 seconds. Solids formed inter alia in the form of hollow spheres having a mean solids diameter of 100 to 500 μm.

After cooling, the material separated off was washed with water until a chloride content of less than 0.1% by weight was reached.

After the washing, the material was calcined in a laboratory chamber furnace at 800° C. for 60 minutes. The cooling rate was 150° C. per minute. The total residence time at temperatures of more than 300° C. was therefore 60 min 10 sec.

The end product had the following properties:
Mean diameter of the solids: 300 μm
Mean diameter of the primary particles: 0.2 μm
L*: 58.9 (lightened tone)
a*: 23.8 (lightened tone)
b*: 11.9 (lightened tone)
Cl content: 0.06% by weight
BET surface area: 7.2 $m^2/g$
DIN pH: 3.2

Comparative Example for Examples 2 and 3

The material from Examples 2 and 3 was investigated after washing without subsequent calcination in the laboratory chamber furnace and had the following properties:
Mean diameter of the solids: 300 μm
Mean diameter of the primary particles: 0.2 μm
L*: 60.8 (lightened tone)
a*: 23.5 (lightened tone)
b*: 23.1 (lightened tone)
Cl content: 0.09% by weight
BET surface area: 20 $m^2/g$ Comparative Example 2

In a spray roast reactor, an aqueous iron(II) chloride solution having a concentration of 340 g/l of $FeCl_2$ and an HCl content of 10 g/l was sprayed into the reactor at a temperature of 660° C. The throughput was 14 l of solution per hour. The material separated off in the cyclone was recycled to the feed stream. The residence time in the reactor was 10 seconds. Solids formed inter alia in the form of hollow spheres having a mean solids diameter of 100 to 500 μm.

After cooling, the material separated off was washed with water until a chloride content of less than 0.1% by weight was reached.

The end product had the following properties:
Mean diameter of the solids: 250 μm
Mean diameter of the primary particles: 0.2 μm
L*: 59.0 (lightened tone)
a*: 20.9 (lightened tone)
b*: 10.9 (lightened tone)
Cl content: 0.09% by weight
BET surface area: 7.2 $m^2/g$ Overview of the examples

|  | Examples | | | Comparative examples | |
| --- | --- | --- | --- | --- | --- |
|  | 1 | 2 | 3 | 2 + 3 | 2 |
| Dewatering in ° C. | 600 | 560 | 560 | 560 | 660 |
| Dewatering time in sec | 10 | 10 | 10 | 10 | 10 |
| Calcination in ° C. | 800 | 750 | 800 | — | — |
| Calcination time in min | 60 | 60 | 60 | — | — |
| Total residence time | 60:10 | 60:10 | 60:10 | :10 | :10 |

-continued

Overview of the examples

|  | Examples | | | Comparative examples | |
| --- | --- | --- | --- | --- | --- |
|  | 1 | 2 | 3 | 2 + 3 | 2 |
| Mean diameter of the solids in μm | 200 | 300 | 300 | 300 | 250 |
| Mean diameter of the primary particles in μm | 0.2 | 0.2 | 0.2 | 0.2 | 0.2 |
| L* | 58.4 | 58.9 | 58.9 | 60.8 | 59.0 |
| a* | 24.4 | 24.3 | 23.8 | 23.5 | 20.9 |
| b* | 13.4 | 13.2 | 11.9 | 23.1 | 10.9 |
| Cl content (% by weight) | 0.1 | 0.07 | 0.06 | 0.09 | 0.09 |
| BET (m²/g) | 6.1 | 9.6 | 7.2 | 20 | 7.2 |
| DIN pH | 2.9 | 3.4 | 3.2 | — | — |

The invention claimed is:

1. A pigment comprising iron oxide, wherein the pigment has an L*, a* and b* value as measured in a lightened tone in CIELAB units of
   L*=58 to 62,
   a*=22 to 27,
   b*=10 to 24, and
   wherein the content of the iron oxide is greater than 99% by weight based on the pigment and further wherein the pigment has a mean solids diameter of 10 to 500 μm.

2. The pigment according to claim 1, wherein the pigment has a BET surface area of 6.0 to 12.0 m²/g.

3. The pigment as claimed in claim 1, wherein the pigment comprises primary particles having a mean size of 0.05 to 0.5 μm.

4. The pigment as claimed in claim 1, wherein the pigment has a pH of 2.5 to 4.0.

5. The pigment of claim 1, wherein the L*, a* and b* values, measured in the lightened tone in CIELAB units are
   L*=59 to 60.5,
   a*=23 to 26,
   b*=10 to 15.

6. The pigment of claim 3, wherein the primary particles have a mean size of 0.1 to 0.3 μm.

7. The pigment as claimed in claim 4, wherein the pigment has a pH of 2.8 to 3.5.

8. A process for the preparation of the pigment as claimed in claim 1, comprising:
   dewatering drops of an iron chloride solution via a thermal treatment at temperatures from 300 to 900° C. in order to form solids; and,
   subsequently, dechlorinating said solids by calcining the solids at temperatures from 200 to 800° C.;
   whereby the dewatering via a thermal treatment and the subsequent declorinating by calcining is carried out in one or more reactors.

9. The process as claimed in claim 8, wherein the iron chloride of the iron chloride solution is FeCl₂ or FeCl₃.

10. The process as claimed in claim 8, wherein the drops of the iron chloride solution have a mean diameter of 50 to 1000 μm.

11. The process as claimed in claim 8, wherein the dechlorination takes place by means of a thermal treatment, wherein said thermal treatment comprises bringing steam into contact with the solids at temperatures of 200 to 400° C.

12. The process as claimed in claim 8, wherein a second thermal treatment is carried out at temperatures of 200 to 800° C.

13. The process as claimed in claim 8, wherein the drops/solids are dewatered and calcined at temperatures of more than 300° C. from between 1 s and 90 min.

14. The process as claimed in claim 8, further comprising:
   after the dewatering, either before or after the calcining, cooling the solids and subsequently washing with water.

15. The process as claimed in claim 8, wherein the steps are carried out in one reactor.

16. The process as claimed in claim 8, further comprising:
   milling, after the step of calcining, the solids until a mean size of 0.05 to 0.5 μm is reached.

17. The process of claim 8, wherein the dewatering takes place at a temperature of 400 to 700° C.

18. The process of claim 13, wherein the drops/solids are dewatered and calcined at temperatures of more than 300° C. from between 5 min and 70 min.

19. The process of claim 16, wherein the milling step comprises:
   a) feeding the solids into a jet mill, a pendulum roller mill or a mechanical classifier mill and
   b) milling said solids until a mean size of 0.1 to 0.3, μm is reached.

20. A process for coloring paints, finishes, paper, food or cosmetics, comprising: mixing the pigment of claim 1 with said paints, finishes, paper, food or cosmetics.

21. A process for coloring renders, paving stones, or mortar mixtures comprising: mixing the pigment of claim 1 with the renders, paving stones or mortar mixtures.

22. A pigment comprising iron oxide, wherein the pigment has an L*, a* and b* value, as measured in a lightened tone in CIELAB units, of
   L*=58 to 62,
   a*=22 to 27,
   b*=10 to 24, and
   wherein the content of the iron oxide is greater than 99% by weight based on the pigment and further wherein the pigment comprises particles which have a mean size of 0.05 to 0.5 μm.

23. The pigment as claimed in claim 22, wherein the pigment has a pH of 2.5 to 4.0.

24. The pigment as claimed in claim 22, wherein the pigment has a chloride content of 0.1% by weight or less, based on the pigment.

25. The pigment of claim 22, wherein the L*, a* and b* values, measured in the lightened tone in CIELAB unfts are
   L*=59 to
   a*=23 to 26,
   b*=10 to 15,
   and the particles have a mean size is 0.1 to 0.3 μm.

26. The pigment of claim 23, wherein the pigment has a pH of 2.8 to 3.5.

* * * * *